United States Patent
Shaffer et al.

(10) Patent No.: US 7,107,334 B1
(45) Date of Patent: Sep. 12, 2006

(54) METHODS AND APPARATUS FOR REDIRECTING NETWORK TRAFFIC

(75) Inventors: Shmuel Shaffer, Palo Alto, CA (US); James A. Aviani, Jr., Santa Barbara, CA (US); Alexander G. Tweedly, Argyll (GB)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/527,085

(22) Filed: Mar. 16, 2000

(51) Int. Cl.
H04J 3/14 (2006.01)
H04Q 9/00 (2006.01)

(52) U.S. Cl. ............... 709/224; 709/227; 370/218; 370/352; 348/7

(58) Field of Classification Search ........ 709/203, 709/206, 220, 224, 226, 228, 201, 227; 710/10; 370/25, 218, 312, 328, 352, 227, 228; 714/4; 348/7
See application file for complete search history.

(56) References Cited

U.S. PATENT DOCUMENTS

| | | | |
|---|---|---|---|
| 5,751,956 A | * | 5/1998 | Kirsch .................. 709/203 |
| 5,848,233 A | * | 12/1998 | Radia et al. ............ 713/201 |
| 5,919,247 A | * | 7/1999 | Van Hoff et al. ........ 709/217 |
| 6,167,438 A | * | 12/2000 | Yates et al. ............. 709/216 |
| 6,230,271 B1 | * | 5/2001 | Wadlow et al. ......... 713/201 |
| 6,370,112 B1 | * | 4/2002 | Voelker ................. 370/218 |
| 6,477,150 B1 | * | 11/2002 | Maggenti et al. ....... 370/312 |
| 6,484,204 B1 | * | 11/2002 | Rabinovich ............ 709/226 |
| 6,496,477 B1 | * | 12/2002 | Perkins et al. ......... 370/228 |
| 6,718,361 B1 | * | 4/2004 | Basani et al. .......... 709/201 |
| 6,751,746 B1 | * | 6/2004 | Jain et al. ................ 714/4 |

OTHER PUBLICATIONS

Hanks et al., Generic Routing Encapsulation, RFC 1701, Cisco Systems, Oct. 1994.

* cited by examiner

*Primary Examiner*—Khanh Quang Dinh
(74) *Attorney, Agent, or Firm*—Beyer, Weaver & Thomas, LLP.

(57) ABSTRACT

Methods and apparatus are described for replicating a plurality of original packets in a packet flow which follows a first routing path. The packet flow is received with a first device, the first device being included in the first routing path. In the first device, the original packets in the packet flow are identified according to at least one predetermined criterion. In the first device, replicate packets corresponding to the original packets are generated. The original packets are transmitted from the first device along the first routing path. The replicate packets are transmitted from the first device along a second routing path which is different from the first routing path.

41 Claims, 7 Drawing Sheets

METHODS AND APPARATUS FOR REDIRECTING NETWORK TRAFFIC

BACKGROUND OF THE INVENTION

The present invention relates to transmission of data in a network environment. More specifically, the present invention relates to methods and apparatus redirecting network traffic. Still more specifically, techniques are described herein for replicating packet flows for a variety of purposes including, for example, troubleshooting, load balancing, and reliability.

Generally speaking, when a client platform communicates with some remote server, whether via the Internet or an intranet, it crafts a data packet which defines a TCP connection between the two hosts, i.e., the client platform and the destination server. More specifically, the data packet has header fields which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy".

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Network caching represents an improvement over the proxy server model which is transparent to end users, high performance, and fault tolerant. By altering the operating system code of an existing router, the router is enabled to recognize and redirect data traffic having particular characteristics such as, for example, a particular protocol intended for a specified port (e.g., TCP with port 80), to one or more network caches connected to the router via an interface having sufficient bandwidth. If there are multiple caches connected to the cache-enabled router, the router selects from among the available caches for a particular request based on a load balancing mechanism.

The network cache to which the request is re-routed "spoofs" the requested destination platform and accepts the request on its behalf via a standard TCP connection established by the cache-enabled router. If the requested information is already stored in the cache it is transmitted to the requesting platform with a header indicating its source as the destination platform. If the requested information is not in the cache, the cache opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. An example of such a network caching technique is embodied in the Web Content Caching Protocol (WCCP) provided by Cisco Systems, Inc., a specific embodiment of which is described in commonly assigned, U.S. patent application Ser. No. 08/946,867 (now U.S. Pat. No. 6,240,461) for METHOD AND APPARATUS FOR FACILITATING NETWORK DATA TRANSMISSIONS filed Oct. 8, 1997, the entirety of which is incorporated herein by reference for all purposes.

Another specific embodiment of a packet redirection protocol which may be used to implement such a network caching technique is described in copending, commonly assigned, U.S. Provisional Patent Application No. 60/168,862 for METHOD AND APPARATUS FOR REDIRECTING NETWORK TRAFFIC filed Dec. 2, 1999, the entirety of which is incorporated herein by reference for all purposes. According to a specific embodiment described in that application, the network caches have the capability of determining that particular redirected packets should be transmitted back to the redirecting router and reinserted into the original traffic flow. This may be done in a manner transparent to the source or destination of the packets. An example of a case in which packets would need to be reinserted in the original flow might be where the cache recognizes the source and destination pairs identified by the packets as corresponding to a connection requiring IP-based authentication. Another example would be where the cache is overloaded and is currently unable to handle all of the redirected traffic.

When information in a packet flow between two devices, e.g., a router and a network cache, is corrupted, it is useful for troubleshooting purposes to examine the sequence of packets as they are transmitted over the link. One technique for determining the cause of such corruption involves the insertion of a hub between the two devices and the connection of a network sniffer to the hub. The hub duplicates all the packets in the flow and the sniffer allows a technician to view the packet sequence. Unfortunately, this troubleshooting technique requires physically connecting the hub in close proximity to one of the two devices. As will be understood, this may not be practicable at geographically remote or isolated customer sites. Therefore, a technique is needed by which the troubleshooting of packet flows in particular routers may be made more practicable.

Another problem associated with network transmissions is reliability. That is, because of a variety of network conditions (e.g., hardware and software failures, network congestion, etc.), transmitted packets occasionally fail to reach their intended destinations. When a packet flow encounters such a condition, a new packet flow must typically be established to avoid the condition and make the specified connection. Not only is there a noticeable latency involved with reestablishing the packet flow, but there are certain client/server connections for which such an interruption is completely unacceptable. Therefore, there is also a need for improving the reliability with which data traffic is transmitted in network environments.

SUMMARY OF THE INVENTION

According to the present invention, a packet redirection technique is provided which allows a device to logically connect with a router and to receive all or part of a packet flow from an arbitrary network distance. According to a specific embodiment, the device connects with the router via any one of a variety of protocols including, for example, WCCP versions 1 and 2, specific implementations of which are described in the above-referenced copending patent applications. The registration process to connect the device to the router involves contacting the network administrator for the network which includes the router and requesting reconfiguration of the router to provide access to the router from a specific IP address corresponding to the device.

However, instead of redirecting the packet traffic to the logically connected device, the router instead replicates the packets of interest and transmits the replicate packets to the device via the redirection protocol. According to a specific embodiment, the characteristic(s) by which the packets of interest are identified are communicated to the router by the logically connected device. That is, when the remote device requests the connection with the router, it also requests the packets of interest by identifying at least one criterion by which the traffic may be identified. It will be understood that packet replication is preferable to actual redirection of the packets which could introduce an unacceptable latency into the packet flow when reinserted. According to a more specific embodiment, the packet redirection protocol with which the device connects to the router operates on the inbound as well as the outbound interfaces of the router so that both directions of a particular packet flow may be received by the logically connected device.

The present invention allows a remotely located engineer to investigate a network problem by actually inspecting the packet flow without disturbing the packet flow (and possibly masking the problem). And, as mentioned above, regardless of the distance between the engineer's test setup and the router under investigation, no additional latency is introduced into the packet flow.

In addition, the technique described herein may be used to increase the reliability with which certain traffic is transmitted in a network. That is, there are situations where in order to ensure a high level of reliability for a particular connection, it would be useful to replicate the corresponding packet flow on two or more routing paths simultaneously. Therefore, the packet replication of the present invention is employed as described above to send one or more replicate packet flows to devices logically connected to a particular router using, for example, WCCP. This ensures that the packets will reach the specified destination in a timely manner.

According to yet another embodiment, the present invention may be used to implement a wide area load balancing scheme in which a client request to one of a plurality of equivalent servers is replicated to some or all of the plurality of servers for servicing by the server which responds to the client first. This ensures the quickest response to client requests by the server most able to handle the traffic. It will be understood that this and the other innovations described herein may exist in combination with other load balancing or load distribution schemes such as, for example, those already existing in WCCP.

Thus, the present invention provides methods and apparatus for replicating a plurality of original packets in a packet flow which follows a first routing path. The packet flow is received with a first device, the first device being included in the first routing path. In the first device, the original packets in the packet flow are identified according to at least one predetermined criterion. In the first device, replicate packets corresponding to the original packets are generated. The original packets are transmitted from the first device along the first routing path. The replicate packets are transmitted from the first device along a second routing path which is different from the first routing path.

A further understanding of the nature and advantages of the present invention may be realized by reference to the remaining portions of the specification and the drawings.

DETAILED DESCRIPTION OF SPECIFIC EMBODIMENTS

Figure 1:
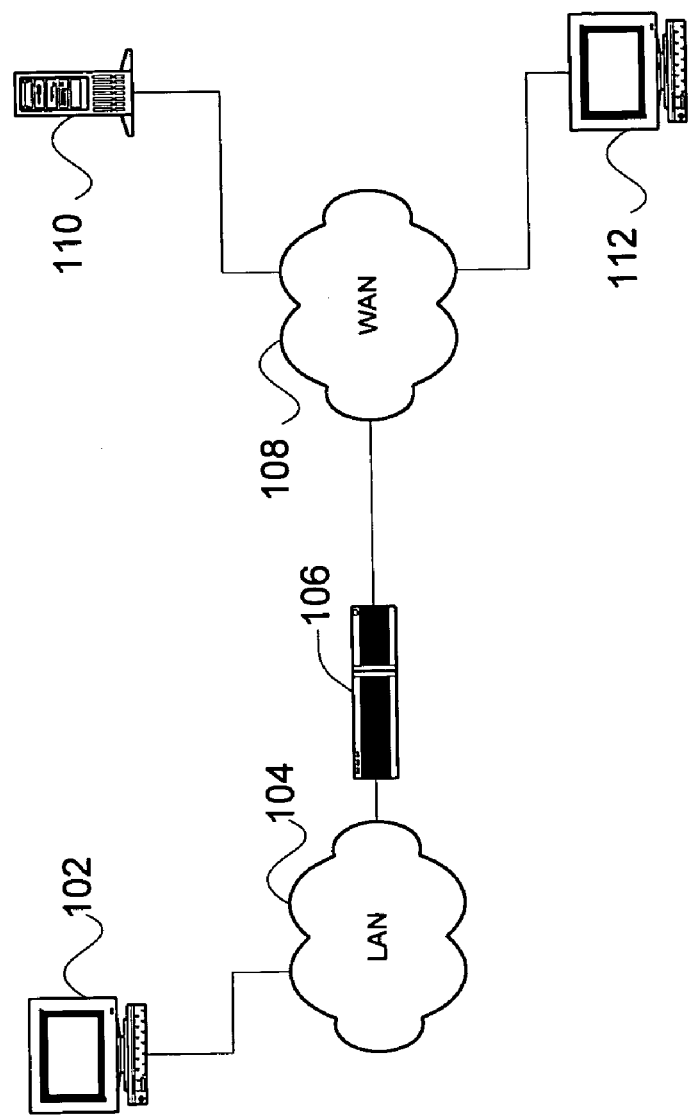
FIG. 1 is a network diagram illustrating a troubleshooting technique according to a specific embodiment of the present invention.
Figure 2:
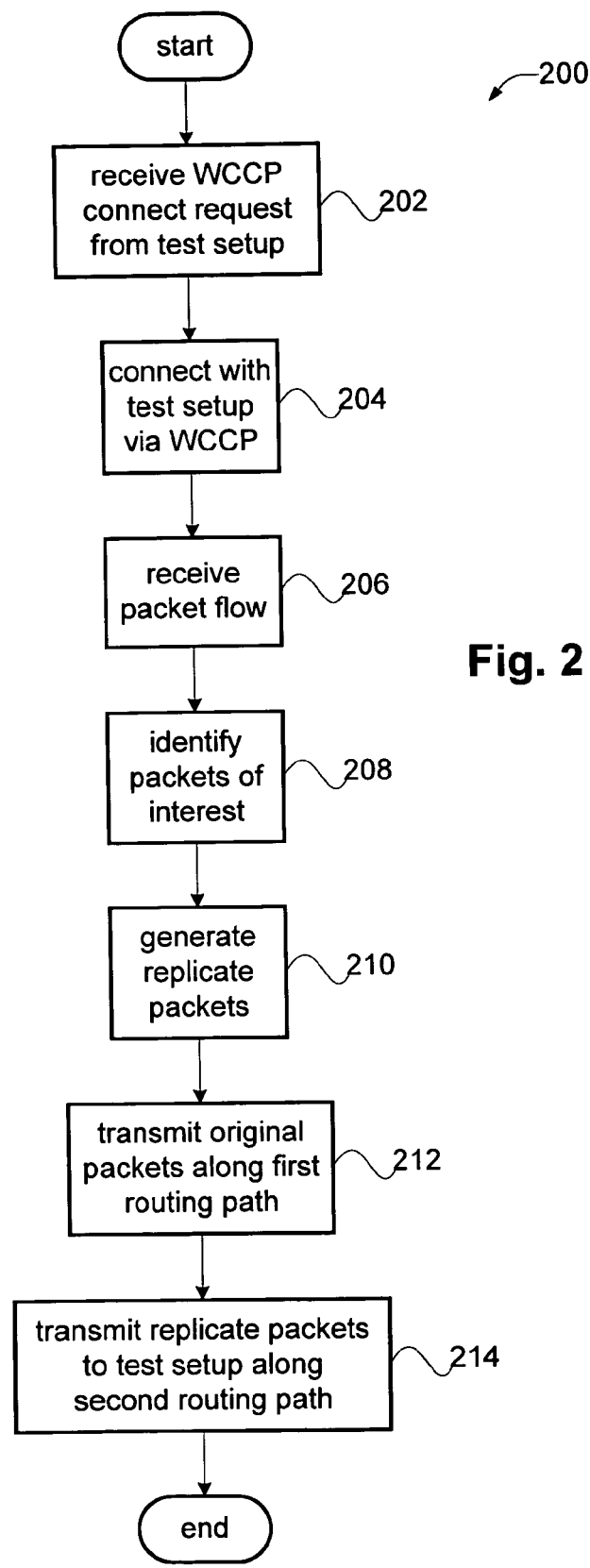
FIG. 2 is a flowchart illustrating a troubleshooting technique according to a specific embodiment of the present invention.

FIG. 1 is a simplified network diagram which will be used in conjunction with the flowchart of FIG. 2 to describe a specific embodiment of the present invention. According to this embodiment, a client machine 102 which is resident on a local area network (LAN) 104 communicates via router 106 and wide area network (WAN) 108, e.g., the Internet, with server 110. As discussed above, when the packet stream between client 102 and server 110 is corrupted, what typically happens is the network administrator of LAN 104 requests the assistance of an engineer employed by the vendor of router 106 which connects LAN 104 to the Internet. That is, the engineer actually goes to the geographic location of router 106, physically attaches a packet sniffer or equivalent test apparatus, and observes the packet flow to determine the cause of the corruption. The reason for this is that for many kinds of network problems it is critical to see the actual packet traffic. As will be understood, depending upon the accessibility of the geographic location of LAN 104, this can be an extremely expensive and inefficient exercise.

By contrast, the present invention allows a test device 112, e.g., a packet sniffer, to logically connect with router 106 from an arbitrary distance via a packet redirection protocol and remotely monitor all or a specified subset of the traffic through router 106. According to a specific embodiment, the protocol with which device 112 connects with router 106 is the Web Cache Coordination Protocol (WCCP) from Cisco Systems, Inc. Specific embodiments of WCCP are described in the above-referenced copending patent applications. According to a more specific embodiment, the protocol is WCCP v.2, i.e., WCCP2. The party desiring access to a particular router requests access from the network administrator over the phone or any other appropriate communication means. The network administrator then configures the router to allow the connection.

Referring now to FIG. 2, in a specific embodiment, once the network administrator configures router 106 to accept an expected connection from the IP address of test device 112, router 106 receives a WCCP connect request from test device 112 (202). According to a specific embodiment, the connect request from test device 112 additionally requests to receive copies of packets destined to client 102 and server 110. Once the connection via WCCP is established (204), router 106 continues receiving its packet flow (206) and begins to identify the packets in the packet flow of interest to the operator of test device 112 (208). That is, router 106 identifies the packets of interest according to one or more predetermined criteria such as, in this example, the fact that the packets correspond to communications between a particular source and destination pair. This may be determined, for example, with reference to the source and destination IP addresses in the packet header. Notwithstanding this specific example, it will be understood that any of a wide variety of criteria for identifying packets of interest may be employed without departing from the scope of the invention.

Once the packets of interest have been identified, they are replicated by router 106 (210). According to an alternative embodiment, the identification and/or the replication of the packets of interest may occur before establishment of the connection with the test device. That is, router 106 could buffer such packets for later transmission to the test device. Once the packets of interest have been replicated, they are transmitted by router 106 along their original routing path to either server 110 or client 102 depending upon their direction (212). In such an embodiment, the packet redirection protocol, e.g., WCCP, would be working on both the inbound and outbound interfaces of router 106. In addition, the packet redirection may occur in a manner which is completely transparent to either end of the client/server communication.

The replicate packets are transmitted by router 106 to test device 112 along a different routing path (214) using the packet redirection protocol. If test device 112 is geographically remote relative to router 106, there may be a significant latency associated with the redirection, i.e., the packets may be seen at test device 112 much later than they are received at client 102 or server 110. Nevertheless, the engineer at test device 112 will see the sequence of packets as they occurred without having to travel to the location of LAN 104. As will be understood, this is an extremely valuable capability even where LAN 104 is within a few miles of the engineer's location.

Figure 3:
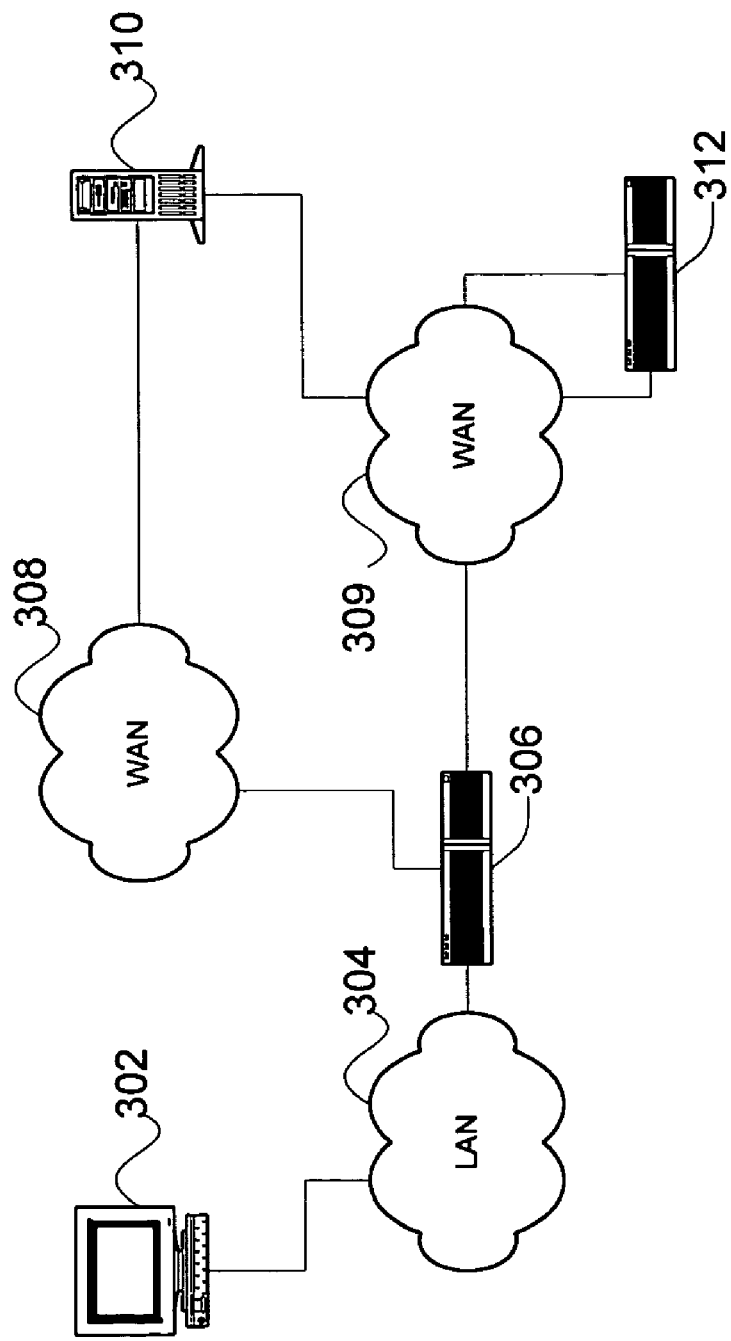
FIG. 3 is a network diagram illustrating a packet replication technique for improved transmission reliability according to a specific embodiment of the present invention.
Figure 4:
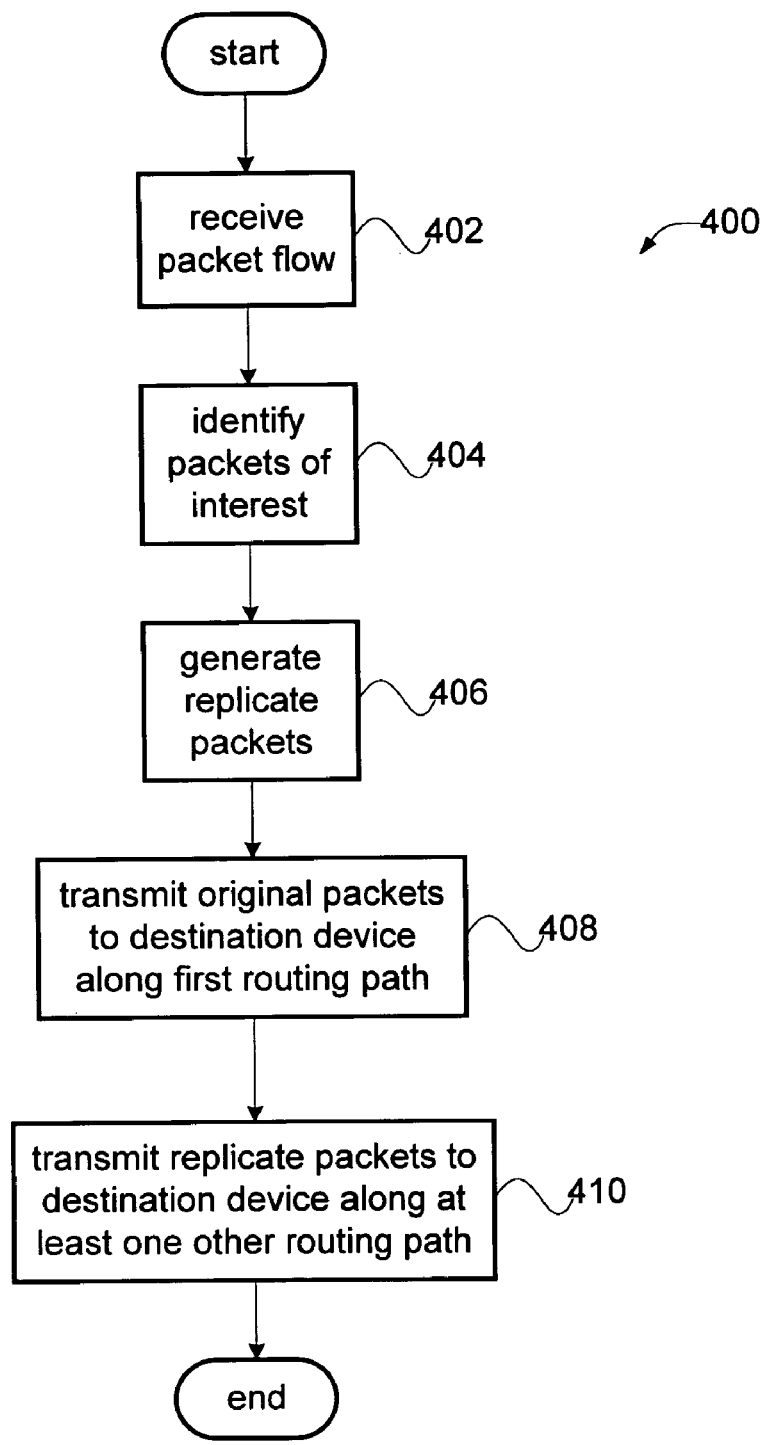
FIG. 4 is a flowchart illustrating a packet replication technique for improved transmission reliability according to a specific embodiment of the present invention.

FIG. 3 is another simplified network diagram which will be used in conjunction with the flowchart of FIG. 4 to describe another specific embodiment of the present invention. According to this embodiment, a client machine 302 which is resident on a LAN 304 may communicate with server 310 via router 306 and either WAN 308 or WAN 309, each of which represents one or more distinct routing paths between client 302 and server 310. It will be understood that WANs 308 and 309 may together represent the Internet. Alternatively, WANs 308 and 309 may include any number of LAN/WAN configurations.

According to a specific embodiment, router 306 replicates specific packets in a packet flow (such as the packets transmitted between client 302 and server 310) and transmits the replicate packets along one or more routing paths which are different than the original packets (e.g., via WAN 309 vs. WAN 308) for the purpose of improving the reliability of the connection between client 302 and server 310. In the illustrated embodiment, a router 312 is shown as part of WAN 309 and is logically connected to router 306 using WCCP2. It will be understood that device 312 may be any of a variety of network devices and still remain within the scope of the present invention. For example, device 312 could be a network cache, a work station, a file server, a switch, etc. It will also be understood that the goal of reliability would be served if, for example, device 312 was serviced by a different Internet service provider (ISP) than the devices of WAN 308.

As router 306 receives its packet flow (402) it identifies packets of interest (404) as defined by the original request from router 312 by which the logical connection between the two routers was established. That is, the packets of interest in the packet flow are identified by router 306 in a manner similar to that described above with reference to FIGS. 1 and 2. The packets of interest are then replicated by router 306 (406). The original packets are transmitted to server 310 along the original routing path (408) while the replicate packets are transmitted to server 310 via at least one other alternate routing path (410). That is, the replicate packets are transmitted to router 312 which, in turn, transmits them to server 310. This replication and redirection may occur any number of times to provide additional levels of redundancy.

Alternatively, the packets may be replicated more than once in router 306 and sent to any number of attached devices for forwarding to server 312.

It will be apparent that because of the redundancy provided by the redirected replicated traffic, the chances that the communication between client 302 and server 310 will be successful are greatly increased.

Figure 5:
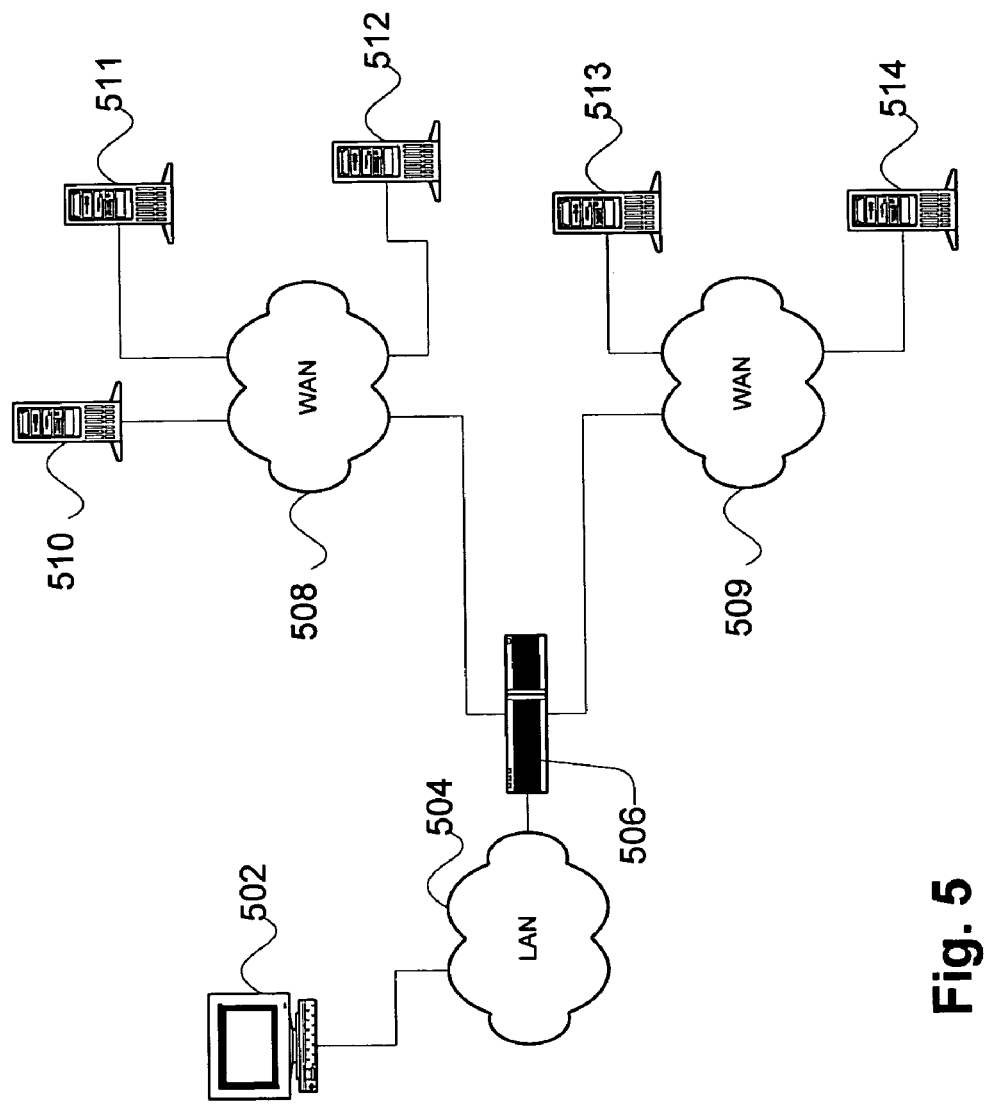
FIG. 5 is a network diagram illustrating a load balancing technique according to a specific embodiment of the present invention.
Figure 6:
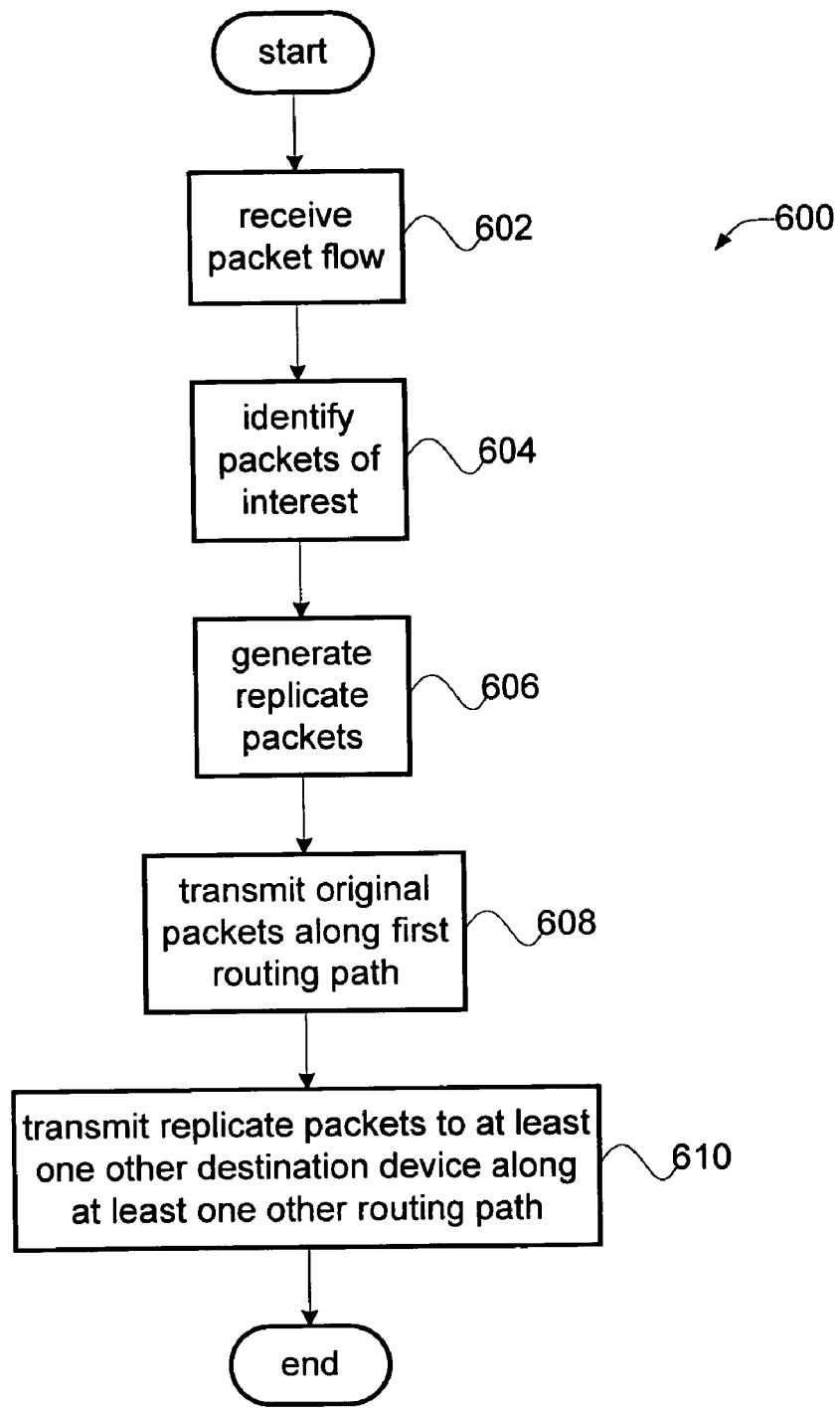
FIG. 6 is a flowchart illustrating a load balancing technique according to a specific embodiment of the present invention.

FIG. 5 is another simplified network diagram which will be used in conjunction with the flowchart of FIG. 6 to describe yet another specific embodiment of the present invention. According to this embodiment, a client machine 502 which is resident on a LAN 504 may communicate with servers 510–512 via router 506 and WAN 508, and servers 513 and 514 via router 506 and WAN 509. It will be understood that WANs 508 and 509 may together represent the Internet. Alternatively, WANs 508 and 509 may include any number of LAN/WAN configurations.

According to the embodiment of FIGS. 5 and 6, a load balancing scheme is provided by which the packets from client 502 are replicated by router 506 and transmitted to a plurality of equivalent servers 510–514. According to a specific embodiment, the first one of servers 510–514 to respond to a request from client 502 "wins" the connection. According to such an embodiment, all subsequent related traffic would then be transmitted between client 502 and the winning server. This would tend to favor creating connections with the server having the lightest load and/or using the routing path having the least congestion. That is, a wide area load balancing scheme is provided which has the ability to adjust to server and network traffic loads on the fly. According to a specific embodiment, each of servers 510–514 is logically connected to router 506 using a packet redirection protocol such as, for example, WCCP2. According to a more specific embodiment, in establishing its logical connection with router 506, each of servers 510–514 requests copies of packets directed to any of servers 510–514.

In the course of receiving and its normal packet flow (602), router 506 identifies the packets of interest in the packet flow (604) according to the criterion or criteria specified by the logically connected devices, i.e., servers 510–514. As discussed above, the packets of interest may be identified using a wide variety of criteria such as, in this example, the destination address(es) to which the packets are directed. That is, according to a specific embodiment, any packets addressed to any of servers 510–514 are identified in the packet flow. Once the packets of interest in the packet flow are so identified, router 506 replicates these packets (606) for transmission to the unspecified servers. The original packets of interest are then transmitted to the originally specified one of servers 510–514 along the original routing path (608), while the replicate packets are transmitted to the unspecified ones of servers 510–514 (610). As discussed above and according to one embodiment, the first one of servers 510–514 to respond to client 502 "wins" the connection. In this way, requests from client 502 will be serviced by the most accessible and available one of servers 510–514.

Generally, the packet redirection techniques of the present invention may be implemented on software and/or hardware. For example, each of the described techniques can be implemented in an operating system kernel, in a separate user process, in a library package bound into network applications, on a specially constructed machine, or on a network interface card. According to specific embodiments, the techniques of the present invention are implemented in software such as an operating system or in an application running on an operating system.

Software or software/hardware hybrid implementations of the invention may be implemented on general-purpose programmable machines selectively activated or reconfigured by a computer program(s) stored in memory. Such programmable machines may be a network device designed to handle network traffic. Such network devices typically have multiple network interfaces including frame relay and ISDN interfaces, for example. Specific examples of such network devices include routers and switches. For example, embodiments of the present invention may be implemented on specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the present invention may be implemented on a general-purpose network host machine such as a personal computer or workstation. Further, the invention may be at least partially implemented on a card (e.g., an interface card) for a network device or a general-purpose computing device.

Figure 7:
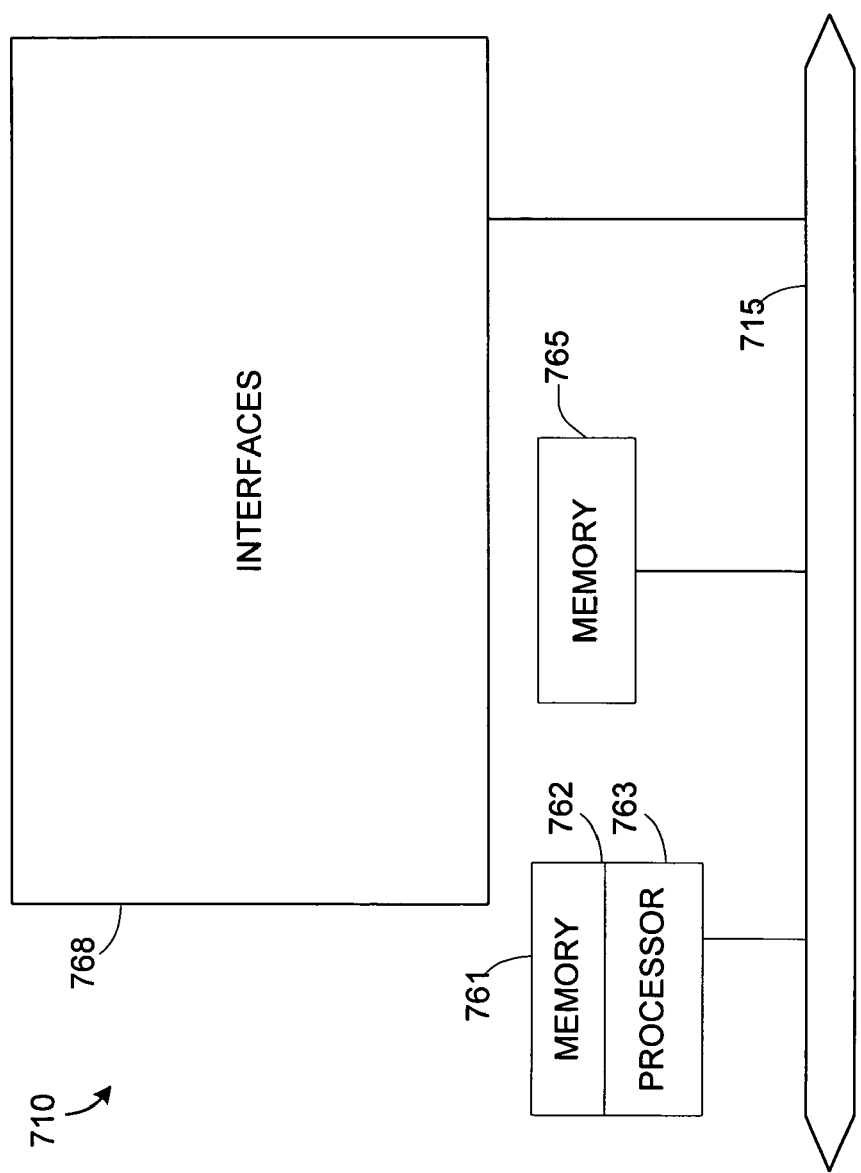
FIG. 7 is a simplified block diagram of a router for use with the various embodiments of the present invention.

Referring now to FIG. 7, a router 710 suitable for implementing the present invention includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for facilitating connection to other device using a packet redirection protocol (e.g., WCCP2), identifying packets of interest, replication of packets, and transmission of packets to their respective destinations, etc. It preferably accomplishes all these functions under the control of software including an operating system (e.g., the Internetwork Operating System (IOS®) of Cisco Systems, Inc.) and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 710. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the packet redirection and replication functions described herein. The program instructions may control the operation of an operating system and/or one or more applications, for example. The memory or memories may also be configured to store packets for replication, replicated packets, packet identification criteria, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, specific embodiments of the invention have been described herein with reference to the use of WCCP for logically connecting a router to another device to which replicate packets are then transmitted. It will be understood, however, that other protocols may be employed to establish the alternate routing path by which replicate packets are transmitted without departing from the scope of the invention.

Moreover, the techniques of the present invention have been described in the context of troubleshooting, reliability, and load balancing schemes. It will be understood, however, that a wide variety of application could advantageously employ the techniques described herein. For example, transparent packet monitoring could be implemented from remote locations. In addition, the specific embodiments described herein have been described with reference to particular network topologies. However, it will be understood that the techniques described herein may be implemented on any of a wide variety of network topologies without departing from the scope of the invention. Therefore, the scope of the invention should be determined with reference to the appended claims.

What is claimed is:

1. A method for replicating a plurality of original packets in both directions of a packet flow received by a first device, the packet flow following a first routing path between a source device and a destination device, the first routing path including the first device, the method comprising:

receiving a request from a second device for connecting with the first device, the request identifying at least one predetermined criterion;

connecting the first device with the second device in response to the request;

receiving both directions of the packet flow with the first device;

in the first device, identifying the original packets from both directions of the packet flow according to the at least one predetermined criterion;

in the first device, generating replicate packets corresponding to the original packets;

transmitting the original packets from the first device along the first routing path to the source and destination devices; and transmitting the replicate packets from the first device along a second routing path, the second routing path being different from the first routing path and including the second device.

2. The method of claim 1 wherein the first and second devices communicate using a protocol which comprises a packet redirection protocol.

3. The method of claim 2 wherein the packet redirection protocol comprises an object caching protocol.

4. The method of claim 1 wherein the origin packets indicate the destination device.

5. The method of claim 1 wherein the second device comprises a test device for facilitating inspection of the replicate packets.

6. The method of clam 1 wherein the original packets originate from a source device, the method for replicating the original packets being transparent to the source device.

7. The method of claim 1 wherein the original packets indicate a destination device, the method for replicating the original packets being transparent to the destination device.

8. The method of claim 1 wherein the first device comprises a router.

9. The method of claim 1 wherein the at least one predetermined criterion comprises at least one selected from a group consisting of a source address, a destination address, a socket, a port, and a protocol type.

10. A method for replicating a plurality of original packets in a packet flow received by a first device, the packet flow following a first routing path which includes the first device, the method comprising:

receiving a request from a second device for connection with the first device, the request identifying at least one predetermined criterion;

connecting the first device with the second device in response to the request;

receiving the packet flow with the first device;

in the first device, identifying the original packets in the packet flow according to the at least one predetermined criterion;

in the first device, generating replicate packets corresponding to the original packets;

transmitting the original packets from the first device along the first routing path;

transmitting the replicate packets from the first device along a second routine path, the second routing path being different from the first routing path and including the second device;

determining which of the original and replicate packets reach their respective destination devices first, thereby identifying a winner destination device; and awarding a connection to an originating device to the winner destination device.

11. The method of claim 10 wherein the first and second devices communicate using a protocol which comprises a packet redirection protocol.

12. The method of claim 11 wherein the packet redirection protocol comprises an object caching protocol.

13. The method of claim 10 wherein the second device comprises a test device for facilitating inspection of the replicate packets.

14. The method of claim 10 wherein the original packets originate from a source device, the method for replicating the original packets being transparent to the source device.

15. The method of claim 10 wherein the original packets indicate a destination device, the method for replicating the original packets being transparent to the destination device.

16. The method of claim 10 wherein the first device comprises a router.

17. The method of claim 10 wherein the at least one predetermined criterion comprises at least one selected from a group consisting of a source address, a destination address, a socket, a port, and a protocol type.

18. A router operable to replicate a plurality of original packets in both directions of a packet flow received by a first device, the packet flow following a first routing path between a source device and a destination device, the first routing path including the first device, the router comprising:
 a memory having at least a portion of a router operating system stored therein; and
 a processor for controlling operation of the router according to the router operating system, the processor being configured by the router operating system to:
  receive a request from a second device for connecting with tae first device, the request identifying at least one predetermined criterion;
  connect the first device with the second device in response to the request;
  receive both directions of the packet flow with the first device;
  in the first device, identify the original packets from both directions of the packet flow according to the at least one predetermined criterion;
  in the first device, generate replicate packets corresponding to the original packets;
  transmit the original packets from the first device along the first routing path to the source and destination devices; and
  transmit the replicate packets from the first device along a second routing path, the second routing path being different from the first routing path and including the second device.

19. An apparatus for replicating a plurality of original packets in both directions of a packet flow received by a first device, the packet flow following a first routing path between a source device and a destination device, the first routing path including the first device, the apparatus comprising:
 means for receiving a request from a second device for connecting with the first device, the request identifying at least one predetermined criterion;
 means for connecting the first device with the second device in response to the request;
 means for receiving both directions of the packet flow with the first device;
 means for, in the first device, identifying the original packets from both directions of the packet flow according to the at least one predetermined criterion;
 means for, in the first device, generating replicate packets corresponding to the original packets;
 means for transmitting the original packets from the first device along the first routing path to the source and destination devices; and
 means for transmitting the replicate packets from the first device along a second routing path, the second routing path being different from the first routing path and including the second device.

20. A computer readable medium on which is provided a computer code for replicating a plurality of original packets in both directions of a packet flow received by a first device, the packet flow following a first routing path between a source device and a destination device, the first routing path including the first device, the computer code comprising instructions for:
 receiving a request from a second device for connecting with the first device, the request identifying at least one predetermined criterion;
 connecting the first device with the second device in response to the request;
 receiving both directions of the packet flow with the first device;
 in the first device, identifying the original packets from both directions of the packet flow according to the at least one predetermined criterion;
 in the first device, generating replicate packets corresponding to the original packets;
 transmitting the original packets from the first device along the first routing path to the source and destination devices; and
 transmitting the replicate packets from the first device along a second routing path, the second routing path being different from the first routing path and including the second device.

21. A router operable to replicate a plurality of original packets in a packet flow received by a first device, the packet flow following a first routing path which includes the first device, the router comprising:
 a memory having at least a portion of a router operating system stored therein; and
 a processor for controlling operation of the router according to the router operating system, the processor being configured by the router operating system to:
  receive a request from a second device for connecting with the first device, the request identifying at least one predetermined criterion;
  connect the first device with the second device in response to the request;
  receive the packet flow with the first device;
  in the first device, identify the original packets in the packet flow according to the at least one predetermined criterion;
  in the first device, generate replicate packets corresponding to the original packets;
  transmit the original packets from the first device along the first routing path;
  transmit the replicate packets from the first device along a second routing path, the second routing path being different from the first routing path and including the second device;
  determine which of the original and replicate packets reach their respective destination devices first, thereby identifying a winner destination device; and award a connection to an original device to the winner destination device.

22. An apparatus for replicating a plurality of original packets in a packet flow received by a first device, the packet flow following a first routing path which includes the first device, the apparatus comprising:
- means for receiving a request from a second device for connecting with the first device, the request identifying at least one predetermined criterion;
- means for connecting the first device with the second device in response to the request;
- means for receiving the packet flow with the first device;
- means for, in the first device, identifying the original packets in the packet flow according to the at least one predetermined criterion;
- means for, in the first device, generating replicate packets corresponding to the original packets;
- means for transmitting the original packets from the first device along the first routing path;
- means for transmitting the replicate packets from the first device along a second routing path, the second routing path being different from the first routing path and including the second device;
- means for determining which of the original and replicate packets reach their respective destination devices first, thereby identifying a winner destination device; and
- means for awarding a connection to an originating device to the winner destination device.

23. A computer readable medium on which is provided a computer code for replicating a plurality of original packets in a packet flow received by a first device, the packet flow following a first routing path which includes the first device, the computer code comprising instructions for:
- receiving a request from a second device for connecting with the first device, the request identifying at least one predetermined criterion;
- connecting the first device with the second device in response to the request;
- receiving the packet flow with the first device;
- in the first device, identifying the original packets in the packet flow according to the at least one predetermined criterion;
- in the first device, generating replicate packets corresponding to the original packets;
- transmitting the original packets from the first device along the first routing path;
- transmitting the replicate packets from the first device along a second routing path, the second routing path being different from the first routing path and including the second device;
- determining which of the original and replicate packets reach their respective destination devices first, thereby identifying a winner destination device; and
- awarding a connection to an originating device to the winner destination device.

24. A method for replicating a plurality of original packets in a packet flow received by a first device, the packet flow following a first routing path which includes the first device, the packet flow corresponding to a destination, the method comprising:
- receiving a request from a second device for connecting with the first device, the request identifying at least one predetermined criterion;
- connecting the first device with the second device in response to the request;
- receiving the packet flow with the first device;
- in the first device, identifying the original packets in the packet flow according to the at least one predetermined criterion;
- in the first device, generating replicate packets corresponding to the original packets;
- transmitting the original packets from the first device along the first routing path to the destination; and
- transmitting the replicate packets from the first device along a second routing path, the second routing path being different from the first routing path and including the second device, wherein the destination is different from the second device.

25. The method of claim 24 wherein the first and second devices communicate using a protocol which comprises a packet redirection protocol.

26. The method of claim 25 wherein the packet redirection protocol comprises an object caching protocol.

27. The method of claim 24 wherein the original packets indicate a destination device, the destination device being included in the first routing path, the first device transmitting the original packets to the destination device via the first routing path, the second device facilitating transmission of the replicate packets to the destination device via the second routing path.

28. The method of claim 24 wherein the second device comprises a test device for facilitating inspection of the replicate packets.

29. The method of claim 24 wherein each of the original packets indicate one of a plurality of destination devices each of the destination devices being logically connected with the first device via a protocol, a first one of the destination devices being included in the first routing path, a second one of destination devices being included in the second routing path, and wherein the replicate packets are transmitted along the second routing path to the second one of the destination devices.

30. The method of claim 24 further comprising:
- determining which of the original and replicate packets reach their respective destination devices first, thereby identifying a winner destination device; and
- awarding a connection to an originating device to the winner destination device.

31. The method of claim 24 wherein the original packets originate from a source device, the method for replicating the original packets being transparent to the source device.

32. The method of claim 24 wherein the original packets indicate a destination device, the method for replicating the original packets being transparent to the destination device.

33. The method of claim 24 wherein the first device comprises a router.

34. The method of claim 24 wherein the at least one predetermined criterion comprises at least one selected from a group consisting of a source address, a destination address, a socket, a port, and a protocol type.

35. A router operable to replicate a plurality of original packets in a packet flow, the packet flow following a first routing path which includes the router, the packet flow corresponding to a destination, the router comprising:
- a memory having at least a portion of a router operating system stored therein; and
- a processor for controlling operation of the router according to the router operating system, the processor being configured by the router operating system to:
  - receive a request from a requesting device for connecting with the router, the request identifying at least one predetermined criterion;

connect the router with the requesting device in response to the request;
receive the packet flow with the router;
identify the original packets in the packet flow according to the at least one predetermined criterion;
generate replicate packets corresponding to the original packets;
transmit the original packets from the router along the first routing path to the destination; and
transmit the replicate packets from the router along a second routing path, the second routing path being different from the first routing path and including the requesting device,
wherein the destination is different from the second device.

36. An apparatus for replicating a plurality of original packets in a packet flow received by a first device, the packet flow following a first routing path which includes the first device, the packet flow corresponding to a destination, the method comprising:
means for receiving a request from a second device for connecting with the first device, the request identifying at least one predetermined criterion;
means for connecting the first device with the second device in response to the request;
means for receiving the packet flow;
means for identifying the original packets in the packet flow according to the at least one predetermined criterion;
means for generating replicate packets corresponding to the original packets;
means for transmitting the original packets along the first routing path to the destination; and
means for transmitting the replicate packets along a second routing path, the second routing path being different from the first routing path and including the second device,
wherein the destination is different from the second device.

37. A computer program product for replicating a plurality of original packets in a packet flow received by a processing device, the packet flow following a first routing path which includes the processing device, the packet flow corresponding to a destination, the computer program product comprising:
at least one computer readable medium; and
computer program instructions stored in the at least one computer readable medium for causing the processing device to:
receive a request from a second device for connecting with the processing device, the request identifying at least one predetermined criterion;
connect with the second device in response to the request;
receive the packet flow;
identify the original packets in the packet flow according to the at least one predetermined criterion;
generate replicate packets corresponding to the original packets;
transmit the original packets along the first routing path to the destination; and
transmit the replicate packets along a second routing path, the second routing path being different from the first rotating path and including the second device,
wherein the destination is different from the second device.

38. A method for remotely monitoring a portion of a packet flow associated with a first device using a second device, the packet flow following a first routing path, the packet flow corresponding to a destination, the method comprising:
receiving a request from the second device for connecting with the first device via a protocol;
logically connecting with the second device via the protocol;
receiving the packet flow with the first device, the first device being included in the first routing path;
in the first device, identifying original packets in the packet flow according to at least one predetermined criterion;
in the first device, generating replicate packets corresponding to the original packets;
transmitting the original packets from the first device along the first routing path to the destination; and
transmitting the replicate packets from the first device to the second device along a second routing path, the second routing path being different from the first routing path,
wherein the destination is different from the second device.

39. A router operable to facilitate monitoring by a remote device of a portion of a packet flow associated with a router, the packet flow following a first routing path which includes the router, the packet flow corresponding to a destination, the router comprising:
a memory having at least a portion of a router operating system stored therein; and
a processor for controlling operation of the router according to the router operating system, the processor being configured by the router operating system to:
receive a request from the remote device for connecting with the first device via a protocol;
logically connect with the remote device via the protocol;
receive the packet flow;
identify original packets in the packet flow according to at least one predetermined criterion;
generate replicate packets corresponding to the original packets;
transmit the original packets along the first routing path to the destination; and
transmit the replicate packets to the remote device along a second routing path, the second routing path being different from the first routing path,
wherein the destination is different from the second device.

40. A router operable to facilitate monitoring by a remote device of a portion of a packet flow associated with a router, the packet flow following a first routing path which includes the router, the packet flow corresponding to a destination, the router comprising:
means for receiving a request from the remote device for connecting with the first device via a protocol;
means for logically connecting with the remote device via the protocol;
means for receiving the packet flow;
means for identifying original packets in the packet flow according to at least one predetermined criterion;
means for generating replicate packets corresponding to the original packets;
means for transmitting the original packets along the first routing path to the destination; and
means for transmitting the replicate packets to the remote device along a second routing path, the second routing path being different from the first routing path, wherein the destination is different from the second device.

41. A computer readable medium on which is provided a computer code for facilitating monitoring by a remote device of a portion of a packet flow associated with a router, the packet flow following a first routing path which includes the router, the packet flow corresponding to a destination, the computer code comprising instructions for:

receiving a request from the remote device for connecting with the first device via a protocol;

logically connecting with the remote device via the protocol;

receiving the packet flow;

identifying original packets in the packet flow according to at least one predetermined criterion;

generating replicate packets corresponding to the original packets;

transmitting the original packets along the first routing path to the destination; and transmitting the replicate packets to the remote device along a second routing path, the second routing path being different from the first routing path, wherein the destination is different from the second device.

* * * * *